US008840223B2

(12) United States Patent
Mizes et al.

(10) Patent No.: US 8,840,223 B2
(45) Date of Patent: Sep. 23, 2014

(54) COMPENSATION FOR ALIGNMENT ERRORS IN AN OPTICAL SENSOR

(71) Applicant: Xerox Corporation, Norwalk, CT (US)

(72) Inventors: Howard A. Mizes, Pittsford, NY (US); Michael J. Levy, Webster, NY (US); Joseph C. Sheflin, Macedon, NY (US)

(73) Assignee: Xerox Corporation, Norwalk, CT (US)

( * ) Notice: Subject to any disclaimer, the term of this patent is extended or adjusted under 35 U.S.C. 154(b) by 94 days.

(21) Appl. No.: 13/680,579

(22) Filed: Nov. 19, 2012

(65) Prior Publication Data

US 2014/0139851 A1 May 22, 2014

(51) Int. Cl.
B41J 29/393 (2006.01)
G06K 15/02 (2006.01)

(52) U.S. Cl.
CPC ..................................... G06K 15/02 (2013.01)
USPC ........................................................... 347/19

(58) Field of Classification Search
None
See application file for complete search history.

(56) References Cited

U.S. PATENT DOCUMENTS

| | | | |
|---|---|---|---|
| 4,328,504 A | 5/1982 | Weber et al. |
| 4,509,057 A | 4/1985 | Sohl et al. |
| 5,075,689 A | 12/1991 | Hoisington et al. |
| 5,160,938 A | 11/1992 | Fargo et al. |
| 5,212,497 A | 5/1993 | Stanley et al. |
| 5,477,244 A | 12/1995 | Shibata et al. |
| 5,576,744 A | 11/1996 | Niikura et al. |
| 5,726,690 A | 3/1998 | Bohorquez et al. |
| 5,831,658 A | 11/1998 | Iga et al. |
| 5,835,108 A | 11/1998 | Beauchamp et al. |
| 5,847,724 A | 12/1998 | Mantell |
| 5,903,681 A | 5/1999 | Rueby et al. |
| 5,923,344 A | 7/1999 | Norum et al. |
| 5,992,962 A | 11/1999 | Yen et al. |
| 6,102,513 A | 8/2000 | Wen |
| 6,141,114 A | 10/2000 | Mantell et al. |
| 6,145,959 A | 11/2000 | Lund et al. |
| 6,168,261 B1 | 1/2001 | Miyake et al. |
| 6,206,502 B1 | 3/2001 | Kato et al. |
| 6,247,787 B1 | 6/2001 | Giere et al. |
| 6,273,542 B1 | 8/2001 | Couwenhoven et al. |
| 6,315,383 B1 | 11/2001 | Sarmast et al. |
| 6,367,903 B1 | 4/2002 | Gast et al. |
| 6,390,580 B1 | 5/2002 | Anderson et al. |
| 6,464,334 B2 | 10/2002 | Lopez et al. |
| 6,532,026 B2 | 3/2003 | Takahashi et al. |
| 6,568,786 B2 | 5/2003 | Sarmast et al. |
| 6,590,598 B2 | 7/2003 | Kodama |
| 6,764,156 B2 | 7/2004 | Mantell |
| 6,814,425 B2 | 11/2004 | Mott et al. |
| 6,819,352 B2 | 11/2004 | Mizes et al. |
| 7,090,324 B2 | 8/2006 | Mizes |
| 7,314,261 B2 | 1/2008 | Jackson Pulver et al. |
| 7,347,525 B2 | 3/2008 | Mizes |
| 7,367,642 B2 | 5/2008 | Ouchi et al. |
| 7,515,305 B2 | 4/2009 | Mizes |
| 7,524,007 B2 | 4/2009 | Pulver et al. |
| 7,524,015 B2 | 4/2009 | Srinivasan et al. |
| 7,543,911 B2 | 6/2009 | Mizes et al. |
| 7,597,418 B2 | 10/2009 | Mantell et al. |
| 2007/0188815 A1 | 8/2007 | Donovan et al. |
| 2009/0003729 A1 | 1/2009 | Metcalfe et al. |
| 2010/0329756 A1 | 12/2010 | Mizes |
| 2011/0279503 A1 | 11/2011 | Mizes et al. |

*Primary Examiner* — Justin Seo

(74) *Attorney, Agent, or Firm* — Maginot, Moore & Beck, LLP

(57) ABSTRACT

A method of operating a printer to detect errors in an optical sensor includes forming a printed line across a first side of a print medium and generating first image data corresponding to the printed line with the optical sensor. The optical sensor generates second image data of the second side of the print medium as the print medium passes the optical sensor a second time. A detect in the optical sensor is identified with reference to a difference between process direction alignments of the line in the first image data and the second image data.

18 Claims, 7 Drawing Sheets

COMPENSATION FOR ALIGNMENT ERRORS IN AN OPTICAL SENSOR

TECHNICAL FIELD

This disclosure relates generally to printers, and, more particularly, to techniques for identifying and compensating for errors in optical sensors that are used in printers.

BACKGROUND

The accurate registration of the inkjets in multiple printheads within a printer enables the printer to produce high quality printed images. Registration refers to the positioning and orientation of the printheads with reference to the other printheads in the printer to ensure accurate alignment of the ink drops ejected by the inkjets in one printhead with the ink drops ejected by the inkjets in another printhead. This accurate alignment is required for precise resolution of an ink image as well as reliable and consistent color production arising from the close proximity of ink drops of different colors. During operation of a printer, the positioning and orientation of the printheads are tested from time to time to help ensure proper registration of the printheads. Once the printheads are properly positioned relative to one another, further adjustments can be made to maintain accurate placement of ink drops in the process direction. One of these adjustments includes timing the firing of different inkjets in the printheads to compensate for characteristics in some inkjets that affect the flight of ink drops from the inkjets.

To adjust the timing for the firing of the inkjets, the printer operates the inkjets to form ink marks, also referred to as test patterns, on the surface of an image receiving member. In some printers, the image receiving member is print media, while in other printers, the image receiving member is a rotating endless belt or drum. An optical sensor is positioned opposite the image receiving member. This optical sensor typically includes a plurality of optical detectors that extend across the surface of the image receiving member in the cross-process direction. Each optical detector receives light reflected from a portion of the surface of the image receiving member that is opposite the detector and generates digital image data corresponding to the amount of reflected light received. These digital image data of the image receiving member surface are used to identify the locations of the marks on the image receiving member in both the process direction and the cross-process direction. A digital controller identifies a distance between the actual positions of ink marks and the expected positions of the ink marks and then adjusts the timing of the firing of the inkjets to enable the inkjets to eject the ink drops closer to the expected positions.

While the optical sensor enables the printer to identify registration errors in the printed test patterns, the optical sensor may have defects that produce inaccurate image data. For example, the optical sensor can be skewed at an angle relative to the cross-process direction across the image receiving surface, the optical sensor may deform and bow, and individual optical detectors may be offset in the process direction relative to the other optical detectors in the sensor. An optical sensor that exhibits one or more of these defects generates image data with inaccurate process direction locations of markings in test patterns on the image receiving surface. Thus, the digital controller adjusts the operation of the printheads to correct for the errors identified from the inaccurate data, but these adjustments introduce new errors since the optical sensor generates inaccurate image data for the new ink drop positions. Thus, improvements to inkjet printers to reduce or eliminate errors in image data that are generated due to defects in the optical sensor would be beneficial.

SUMMARY

In one embodiment, a method of operating a printer to form printed images on a print medium with a plurality of pages has been developed. The method includes moving a print medium through a printer a first time in a process direction, ejecting ink drops from a plurality of inkjets in the printer to form a line extending in a cross-process direction on a first side of the print medium, moving the print medium through the printer a second time with a second side of the print medium facing the optical sensor, generating image data corresponding to the line on the first side of the print medium with the optical sensor facing the second side of the print medium, and identifying a difference between a process direction alignment of the line in the image data and another line extending in the cross-process direction to enable a controller to compensate for the difference during processing of image data generated by the optical sensor.

In another embodiment, a printer that is configured to form printed images on a print medium with a plurality of pages has been developed. The printer includes a media transport configured to move a print medium in a process direction, a plurality of inkjets configured to form a printed image on the print medium, an optical sensor configured to generate image data corresponding to the print medium and the feature in each page of the print medium, and a controller operatively connected to the media transport, marking unit, and optical sensor. The controller is configured to operate the media transport to move a print medium through the printer a first time in a process direction, generate firing signals for the plurality of inkjets to eject ink drops to form a line extending in a cross-process direction on a first side of the print medium, operate the media transport to move the print medium through the printer a second time with a second side of the print medium facing the optical sensor, generate image data corresponding to the line with the optical sensor facing the second side of the print medium, and identify a defect in the optical sensor with reference to a difference between a process direction alignment of the line in the image data and another line extending in the cross-process direction.

BRIEF DESCRIPTION OF THE DRAWINGS

The foregoing aspects and other features of a printer that corrects for defects in an optical sensor are explained in the following description, taken in connection with the accompanying drawings.

DETAILED DESCRIPTION

Figure 1:
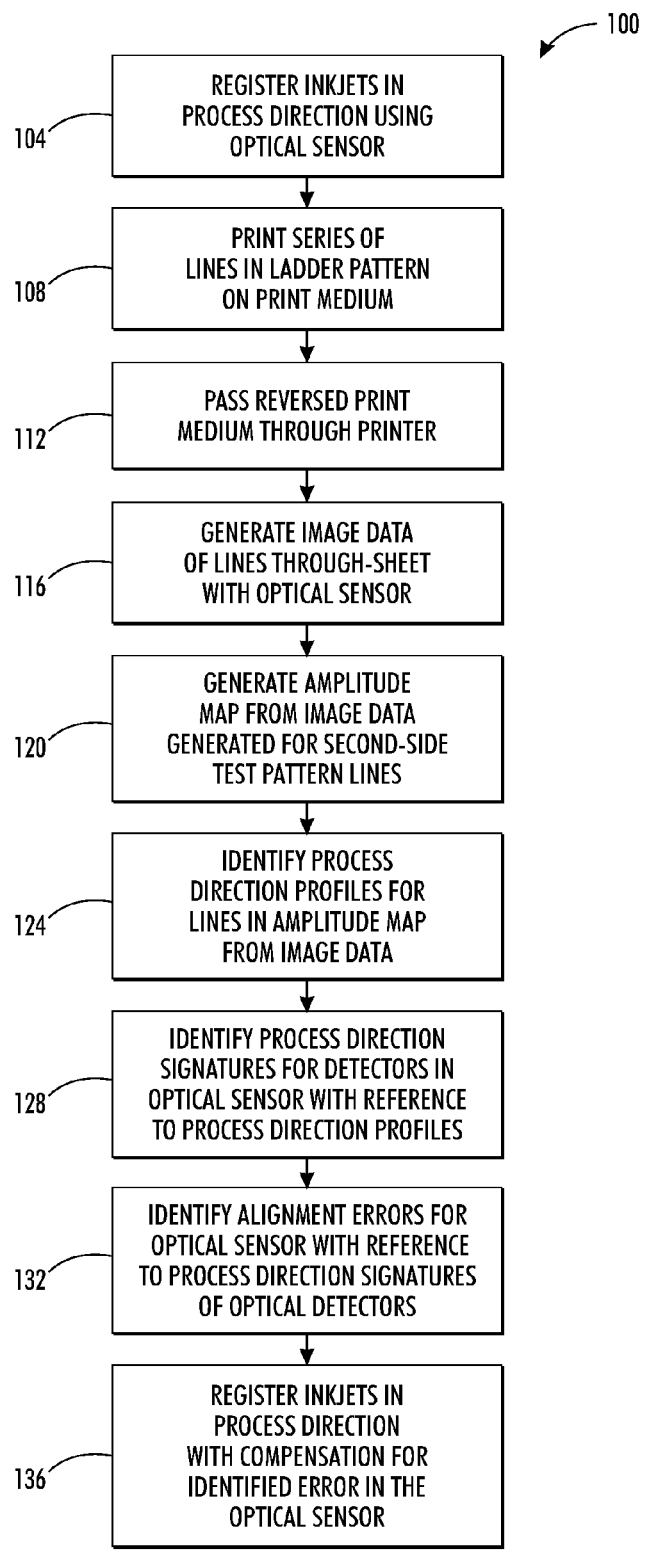
FIG. 1 is a block diagram of a process for identifying errors in an optical sensor that generates image data used to register printheads in a printer and for compensating for the errors in a registration process.

For a general understanding of the environment for the system and method disclosed herein as well as the details for the system and method, reference is made to the drawings. In the drawings, like reference numerals have been used throughout to designate like elements. As used herein, the word "printer" encompasses any apparatus that produces images with colorants on media, such as digital copiers, bookmaking machines, facsimile machines, multi-function machines, or the like.

As used herein, the term "process direction" refers to a direction of movement of a print medium, such as a paper sheet or continuous media web, along a media path through a printer. The print medium moves past one or more printheads in the print zone to receive ink images and passes other printer components, such as heaters, fusers, pressure rollers, and on-sheet imaging sensors, that are arranged along the media path. As used herein, the term "cross-process" direction refers to an axis that is perpendicular to the process direction along the surface of the print medium.

As used herein, the term "dash" refers to a mark formed on an image receiving member that includes a series of ink drops extending in the process direction formed by a single inkjet in a printhead. A dash can be formed from ink drops located in adjacent pixels in the process direction on the image receiving member and can include a pattern of on/off adjacent pixels in the process direction. As used herein, the term "pixel" refers to a location in a two-dimensional arrangement of image data corresponding to a location on the image receiving member. During a printing operation, a controller in the printer identifies pixels in the image data and generates firing signals for inkjets in the print zone at appropriate times to eject ink drops onto the corresponding pixel locations on the image receiving member. The image data and corresponding locations on the image receiving member can be identified with a grid-like pattern of pixels extending in the process direction and cross-process direction on the image receiving member. As used herein, the term "test pattern" refers to a predetermined arrangement of dashes formed on an image receiving member by one or more printheads in the printer. In some embodiments, a test pattern includes a predetermined arrangement of a plurality of dashes formed by some or all of the inkjets in the printheads arranged in the print zone.

As used herein, the term "reflectance value" refers to a numeric value assigned to an amount of light that is reflected from a pixel on the image receiving member. In some embodiments, the reflectance value is assigned to an integer value of between 0 and 255. A reflectance value of 0 represents a minimum level of reflected light, such as a pixel that is covered in black ink, and a reflectance value of 255 represents a maximum level of reflected light, such as light reflected from white paper used as an image receiving member. In other embodiments the reflectance value can be a non-integer value that covers a different numeric range. Some embodiments measure reflectance values that include multiple numeric values corresponding to different color separations such as red, green, and blue (RGB) values. In a test pattern that includes dashes printed on a highly reflective image receiving member, the image data corresponding to a dash have lower image reflectance values than the surrounding image receiving member.

Figure 8:
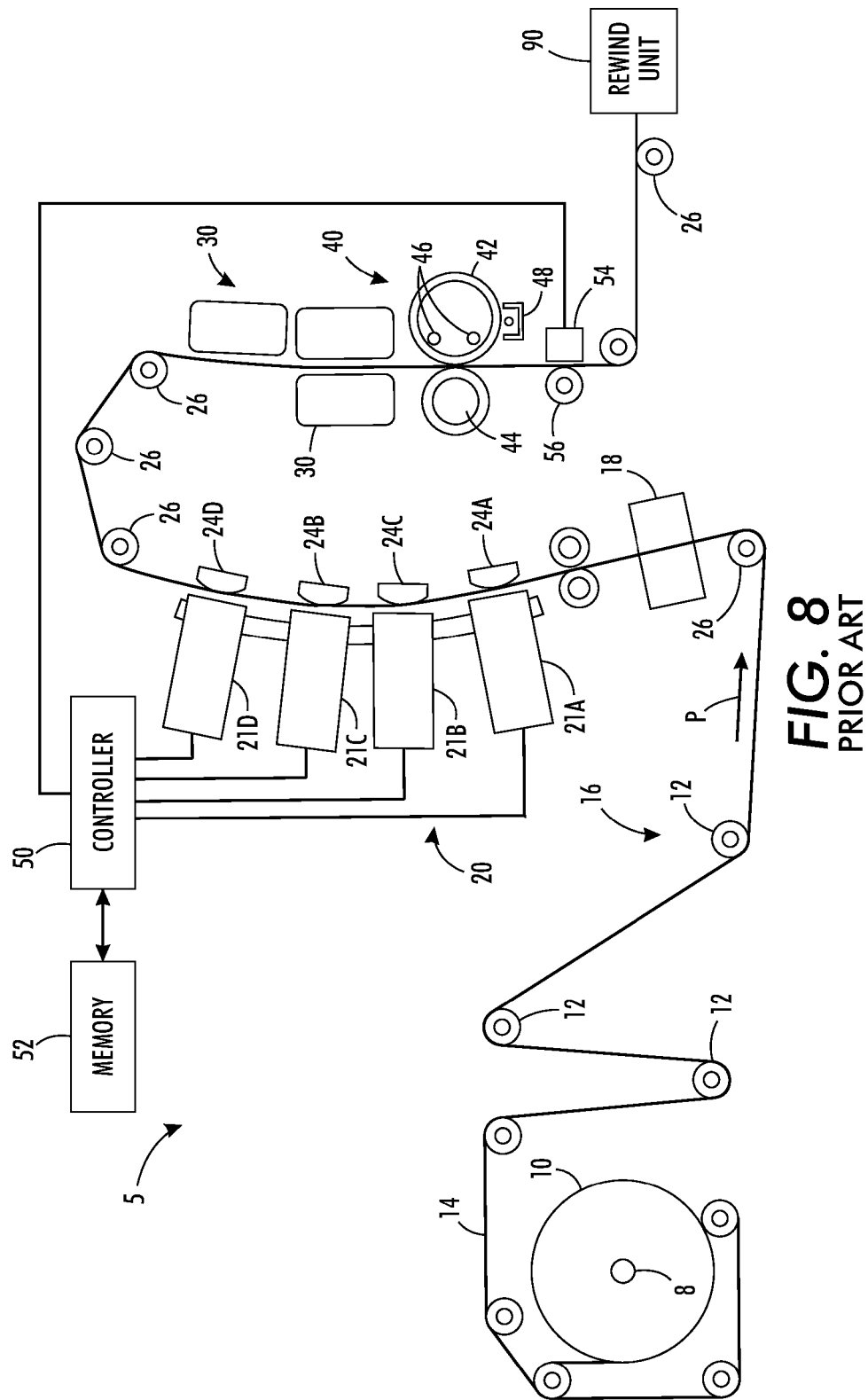
FIG. 8 is a schematic diagram of a prior art continuous web inkjet printer.

FIG. 8 depicts a prior-art inkjet printer 5. For the purposes of this disclosure, an inkjet printer employs one or more inkjet printheads to eject drops of ink into an image receiving member such as paper, another print medium, or an indirect member such as a rotating image drum or belt. The printer 5 is configured to print ink images with a "phase-change ink," by which is meant an ink that is substantially solid at room temperature and that transitions to a liquid state when heated to a phase change ink melting temperature for jetting onto the imaging receiving member surface. The phase change ink melting temperature is any temperature that is capable of melting solid phase change ink into liquid or molten form. In one embodiment, the phase change ink melting temperature is approximately 70° C. to 140° C. In alternative embodiments, the ink utilized in the printer comprises UV curable gel ink. Gel inks are also heated before being ejected by the inkjet ejectors of the printhead. As used herein, liquid ink refers to melted solid ink, heated gel ink, or other known forms of ink, such as aqueous inks, ink emulsions, ink suspensions, ink solutions, or the like.

The printer 5 includes a controller 50 to process the image data before generating the control signals for the inkjet ejectors to eject colorants. Colorants can be ink, or any suitable substance that includes one or more dyes or pigments and that is applied to the selected media. The colorant can be black, or any other desired color, and some printer configurations apply a plurality of distinct colorants to the media. The media includes any of a variety of substrates, including plain paper, coated paper, glossy paper, or transparencies, among others, and the media can be available in sheets, rolls, or other physical formats.

The printer 5 is an example of a direct-to-web, continuous-media, phase-change inkjet printer that includes a media supply and handling system configured to supply a long (i.e., substantially continuous) web of media 14 of "substrate" (paper, plastic, or other printable material) from a media source, such as spool of media 10 mounted on a web roller 8. The media web 14 includes a large number (e.g. thousands or tens of thousands) of individual pages that are separated into individual sheets with commercially available finishing devices after completion of the printing process. Some webs include perforations that are formed between pages in the web to promote efficient separation of the printed pages. For simplex printing, the printer 5 passes the media web 14 through a media conditioner 16, print zone 20, and rewind unit 90 once.

The media web 14 is unwound from the source 10 as needed and a variety of motors, not shown, rotate one or more rollers 12 and 26 to propel the media web 14. The media conditioner includes rollers 12 and a pre-heater 18. The rollers 12 and 26 control the tension of the unwinding media as the media moves along a path through the printer. In alternative embodiments, the printer transports a cut sheet media through the print zone in which case the media supply and handling system includes any suitable device or structure to enable the transport of cut media sheets along a desired path through the printer. The pre-heater 18 brings the web to an initial predetermined temperature that is selected for desired image characteristics corresponding to the type of media being printed as well as the type, colors, and number of inks being used. The pre-heater 18 can use contact, radiant, conductive, or convective heat to bring the media to a target preheat temperature, which in one practical embodiment, is in a range of about 30° C. to about 70° C.

The media is transported through a print zone 20 that includes a series of marking units or units 21A, 21B, 21C, and 21D, each marking unit effectively extends across the width of the media and is able to eject ink directly (i.e., without use of an intermediate or offset member) onto the moving media. In printer 5, each of the printheads ejects a single color of ink, one for each of the colors typically used in color printing, namely, cyan, magenta, yellow, and black (CMYK). The controller 50 of the printer receives velocity data from encoders mounted proximately to rollers positioned on either side of the portion of the path opposite the four printheads to calculate the linear velocity and position of the web as the web moves past the printheads. The controller 50 uses these data to generate firing signals for actuating the inkjet ejectors in the printheads to enable the printheads to eject four colors of ink with appropriate timing and accuracy for registration of the differently colored patterns to form color images on the media. The inkjet ejectors actuated by the firing signals correspond to digital data processed by the controller 50. The digital data for the images to be printed can be transmitted to the printer, generated by a scanner (not shown) that is a component of the printer, or otherwise generated and delivered to the printer. In various configurations, a marking unit for each primary color includes one or more printheads; multiple printheads in a single marking unit are formed into a single row or multiple row array; printheads of a multiple row array are staggered; a printhead prints more than one color; or the printheads or portions thereof are mounted movably in a direction transverse to the process direction P for printing operations, such as for spot-color applications and the like.

Associated with each marking unit is a backing member 24A-24D, typically in the form of a bar or roll, which is arranged substantially opposite the printhead on the back side of the media. Each backing member positions the media at a predetermined distance from the printhead opposite the backing member. The backing members 24A-24D are optionally configured to emit thermal energy to heat the media to a predetermined temperature, which is in a range of about 40° C. to about 60° C. in printer 5. The various backer members can be controlled individually or collectively. The pre-heater 18, the printheads, backing members 24A-24D (if heated), as well as the surrounding air combine to maintain the media along the portion of the path opposite the print zone 20 in a predetermined temperature range of about 40° C. to 70° C.

As the partially-imaged media web 14 moves to receive inks of various colors from the printheads of the print zone 20, the printer 5 maintains the temperature of the media web within a given range. The printheads in the marking units 21A-21D eject ink at a temperature typically significantly higher than the temperature of the media web 14. Consequently, the ink heats the media, and temperature control devices can maintain the media web temperature within a predetermined range. For example, the air temperature and air flow rate behind and in front of the media web 14 impacts the media temperature. Accordingly, air blowers or fans can be utilized to facilitate control of the media temperature. Thus, the printer 5 maintains the temperature of the media web 14 within an appropriate range for the jetting of all inks from the printheads of the print zone 20. Temperature sensors (not shown) can be positioned along this portion of the media path to enable regulation of the media temperature.

Following the print zone 20 along the media path are one or more "mid-heaters" 30. A mid-heater 30 can use contact, radiant, conductive, and/or convective heat to control a temperature of the media. The mid-heater 30 brings the ink placed on the media to a temperature suitable for desired properties when the ink on the media is sent through the spreader 40. In one embodiment, a useful range for a target temperature for the mid-heater is about 35° C. to about 80° C. The mid-heater 30 has the effect of equalizing the ink and substrate temperatures to within about 15° C. of each other. Lower ink temperature gives less line spread while higher ink temperature causes show-through (visibility of the image from the other side of the print). The mid-heater 30 adjusts substrate and ink temperatures to 0° C. to 20° C. above the temperature of the spreader.

Following the mid-heaters 30, a fixing assembly 40 applies heat and/or pressure to the media to fix the images to the media. The fixing assembly includes any suitable device or apparatus for fixing images to the media including heated or unheated pressure rollers, radiant heaters, heat lamps, and the like. In the embodiment of the FIG. 8, the fixing assembly includes a "spreader" 40, that applies a predetermined pressure, and in some implementations, heat, to the media. The function of the spreader 40 is flatten the individual ink droplets, strings of ink droplets, or lines of ink on web 14 and flatten the ink with pressure and, in some systems, heat. The spreader flattens the ink drops to fill spaces between adjacent drops and form uniform images on the media web 14. In addition to spreading the ink, the spreader 40 improves fixation of the ink image to the media web 14 by increasing ink layer cohesion and/or increasing the ink-web adhesion. The spreader 40 includes rollers, such as image-side roller 42 and pressure roller 44, to apply heat and pressure to the media. Either roll can include heat elements, such as heating elements 46, to bring the web 14 to a temperature in a range from about 35° C. to about 80° C. In alternative embodiments, the fixing assembly spreads the ink using non-contact heating (without pressure) of the media after the print zone 20. Such a non-contact fixing assembly can use any suitable type of heater to heat the media to a desired temperature, such as a radiant heater, UV heating lamps, and the like.

In one practical embodiment, the roller temperature in spreader 40 is maintained at an optimum temperature that depends on the properties of the ink, such as 55° C. Generally, a lower roller temperature gives less line spread while a higher temperature produces imperfections in the gloss of the ink image. Roller temperatures that are too high may cause ink to offset to the roll. In one practical embodiment, the nip pressure is set in a range of about 500 to about 2000 psi lbs/side. Lower nip pressure produces less line spread while higher pressure may reduce pressure roller life.

The spreader 40 can include a cleaning/oiling station 48 associated with image-side roller 42. The station 48 cleans and/or applies a layer of some release agent or other material to the roller surface. The release agent material can be an amino silicone oil having viscosity of about 10-200 centipoises. A small amount of oil transfers from the station to the media web 14, with the printer 5 transferring approximately 1-10 mg per A4 sheet-sized portion of the media web 14. In one embodiment, the mid-heater 30 and spreader 40 are combined into a single unit, with their respective functions occurring relative to the same portion of media simultaneously. In another embodiment the media is maintained at a high temperature as the media exits the print zone 20 to enable spreading of the ink.

In printer 5, the controller 50 is operatively connected to various subsystems and components to regulate and control operation of the printer 5. The controller 50 is implemented with general or specialized programmable processors that execute programmed instructions. The instructions and data required to perform the programmed functions are stored in a memory 52 that is associated with the controller 50. The memory 52 stores programmed instructions for the controller. The processors, their memories, and interface circuitry configure the controllers and/or print engine to perform the printer operations. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in VLSI circuits. Also, the circuits described herein can be implemented with a combination of processors, ASICs, discrete components, or VLSI circuits. The controller 50 is operatively connected to the printheads in the marking units 21A-21D. The controller 50 generates electrical firing signals to operate the individual inkjets in the marking units 21A-21D to eject ink drops that form printed images on the media web 14. As described in more detail below, the controller 50 activates and deactivates inkjets in the marking units 21A-21D to print ink images, including test patterns, on the media web 14. The activated inkjets receive firing signals and eject ink drops at various times during the printing process. The deactivated inkjets do not receive the firing signals, and consequently do not eject ink drops during the printing process.

The printer 5 includes an optical sensor 54 that is configured to generate image data corresponding to the media web 14 and a backer roller 56. The optical sensor is configured to detect, for example, the presence, reflectance values, and/or location of ink drops jetted onto the receiving member by the inkjets of the printhead assembly. The optical sensor 54 includes an array of optical detectors mounted to a bar or other longitudinal structure that extends across the width of an imaging area on the image receiving member. In one embodiment in which the imaging area is approximately twenty inches wide in the cross-process direction and the printheads print at a resolution of 600 dpi in the cross-process direction, over 12,000 optical detectors are arrayed in a single row along the bar to generate a single scanline of image data corresponding to a line across the image receiving member. The optical detectors are configured in association in one or more light sources that direct light towards the surface of the image receiving member.

During operation, the optical detectors receive the light generated by the light sources after the light is reflected from the image receiving member. Each optical detector includes an individual lens that focuses the light received by the corresponding optical detector. As described in more detail below, misalignments to individual lenses, which are referred to as lenslet errors, introduce process direction errors into image data generated by the corresponding optical detectors in the optical sensor 54.

The magnitude of the electrical signal generated by an optical detector in response to light being reflected by the bare surface of the media web 14, markings formed on the media web 14, and portions of a backer roll 56 support member corresponds to an amount of light received by the optical sensor 54. The magnitudes of the electrical signals generated by the optical detectors are converted to digital values by an appropriate analog/digital converter. In addition to generating image data for markings that are formed on the surface of the media web 14 that faces the optical sensor 54, some markings formed on the reverse side of the media web 14 that engage the backer roller 56 can be detected for appropriate forms of print media and ink markings. For example, in the absence of black lines or other darker markings that are printed on the reverse side of a white paper web 14, some portion of the light is transmitted through the media, reflects off the backer roll, and is detected by the optical sensor 54. If black lines or other darker markings are present on the reverse side of the media, however, this light is absorbed and the light detected by the optical sensor 54 is smaller. The side of the paper web 14 that faces the optical sensor 54 is substantially blank in the region around the reverse-side markings.

FIG. 1 depicts a process 100 for identifying errors in an optical sensor and for compensating for the errors to enable accurate process direction registration of inkjets in an inkjet printer. In the discussion below, a reference to the process performing a function or action refers to a controller executing programmed instructions stored in a memory operatively connected to the controller to operate one or more components in a printer to perform the function or action. Process 100 is described in conjunction with the printer 5 for illustrative purposes.

Process 100 begins with a prior art printhead registration operation (block 104). In the printer 5, the individual printheads in the marking units 21A-21D eject ink drops to form test patterns on the media web 14. In one embodiment, the test patterns include a plurality of rows of dashes where each dash includes multiple drops of ink from one inkjet in the print zone 20. The test patterns include at least one dash formed by each inkjet in the print zone 20. The media web 14 subsequently passes the optical sensor 54 and the optical sensor 54 generates image data corresponding to the marks in the test pattern. As part of the registration process, the controller 50 identifies the relative process direction locations of dashes from each inkjet in the print zone.

Figure 9A:
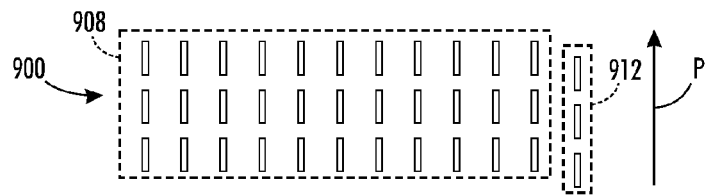
FIG. 9A is a prior art diagram depicting image data of a test pattern that is generated with a misaligned optical sensor in a printer after inkjets in the printer are calibrated with reference to the misaligned optical sensor.

When printing the test pattern marks, some of the inkjets tend to eject ink drops that form marks either upstream or downstream of the marks from other inkjets that should be aligned in the process direction. For example, in FIG. 9A image data 900 corresponding to a test pattern include dashes 912 that are offset in the process direction from other sets of dashes in the test pattern. After identifying the process direction offset for an inkjet, the controller 50 in the printer 5 adjusts the time at which firing signals are generated for the inkjets to correct for the identified process direction offset. For example, the controller 50 can bring the operation of an inkjet forward in time or delay the operation of an inkjet so that ink drops from the inkjet land on the correct pixel locations on the media web 14. In the example of FIG. 9A, the controller 50 brings forward the generation of firing signals for the inkjet corresponding to the dashes 912 so to align the inkjet with the other inkjets in the print zone.

The printhead registration process described above with reference to the processing of block 104 is generally known to the art and is effective at registering printheads and individual inkjets to produce printed ink images with one or more colors. One drawback of the printhead registration process is that the registration process relies on image data generated by the optical sensor 54. Thus, if there are errors in the alignment of the optical sensor 54, then the registration process adjusts the operation of the inkjets in the printheads to conform to the errors in the optical sensor 54.

Figure 9B:
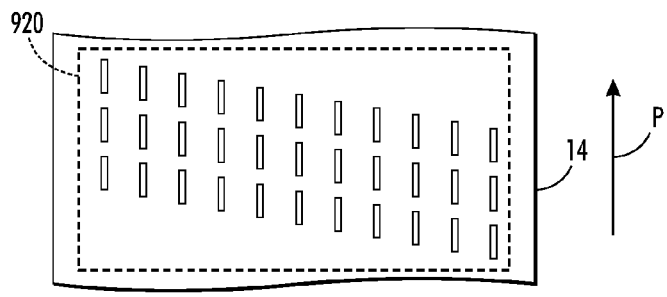
FIG. 9B is a prior art depiction of printed marks in a test pattern that are formed with inkjets that are calibrated with an optical sensor that is skewed in the process direction.
Figure 9C:
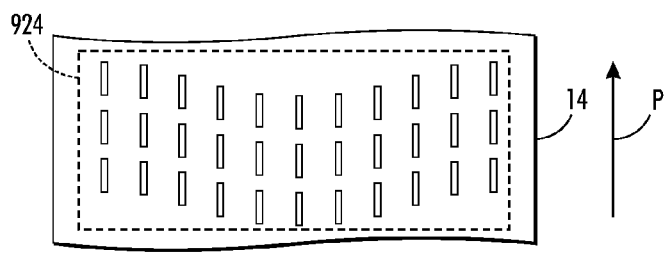
FIG. 9C is a prior art depiction of printed marks in a test pattern that are formed with inkjets that are calibrated with an optical sensor that is bowed in the process direction.
Figure 9D:
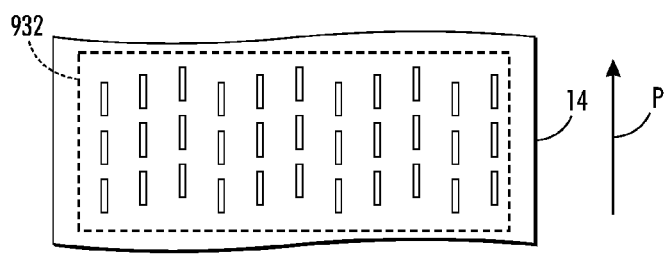
FIG. 9D is a prior art depiction of printed marks in a test pattern that are formed with inkjets that are calibrated with an optical sensor that has errors in the alignment of lenses for individual optical detectors in the optical sensor.

FIG. 9B-FIG. 9D depict examples of printed marks formed after the registration process 104 when the optical sensor 54 generates errors in the image data. In FIG. 9B the marks 920 printed on the media web 14 exhibit a skew if the optical sensor 54 is skewed with reference to the cross-process direction. In FIG. 9C, the marks 924 exhibit a bowed shape due to a bow near in the central portion of the optical sensor 54. In FIG. 9D, individual printed marks 932 are offset in the process direction due to lenslet errors in the individual optical sensors that are included in the optical sensor 54. In each of the examples depicted in FIG. 9B-FIG. 9D, the image data 908 do not indicate the errors in printed dash locations because errors in the optical sensor 54 correspond to the errors in the marks 920, 924, or 932. Further, if the inkjets in the print zone 20 were properly registered, the optical sensor 54 would generate image data indicating that the accurately aligned marks in the test pattern are misaligned. While FIG. 9B-FIG. 9D depict skew, bow, and lenslet errors, respectively, the optical sensor 54 may exhibit a combination of these or other errors.

Referring again to FIG. 1, process 100 continues by printing one or more lines extending across the media web 14 with at least a portion of the inkjets in the print zone after performing the printhead registration operation (block 108). In one configuration, the printer 5 prints a series of lines that extend in the process direction and are repeated in the cross-process direction in a pattern that resembles rungs on a ladder. The response of the optical sensor to the presence of the line on the side of the paper opposite the optical sensor increases as the width of each line in the cross process direction increases until the line width becomes substantially greater than the thickness of the paper. Each line can have a thickness in the process direction of several pixels to enable efficient detection of the lines in the image data. The printheads in the print zone 20 form multiple lines with a single group of inkjets to further increase the accuracy of the measurement to such noise sources as random contaminants on the media web 14 and random errors in drop placement during the printing process.

Referring to FIG. 1 and FIG. 8, the media web 14 is removed from the media path in the printer 5, inverted, and subsequently passed through the media path and optical sensor 54 a second time for duplex printing (block 112). In the printer 5, the media web 14 is fed to the rewind unit 90, and is subsequently re-mounted on the web roller 8 for inverted passage through the printer 5. The inverted web presents the second, previously unprinted, side of the media web 14 to the optical sensor 54 while the first side, including the printed lines, faces the backer roller 56.

Figure 3:
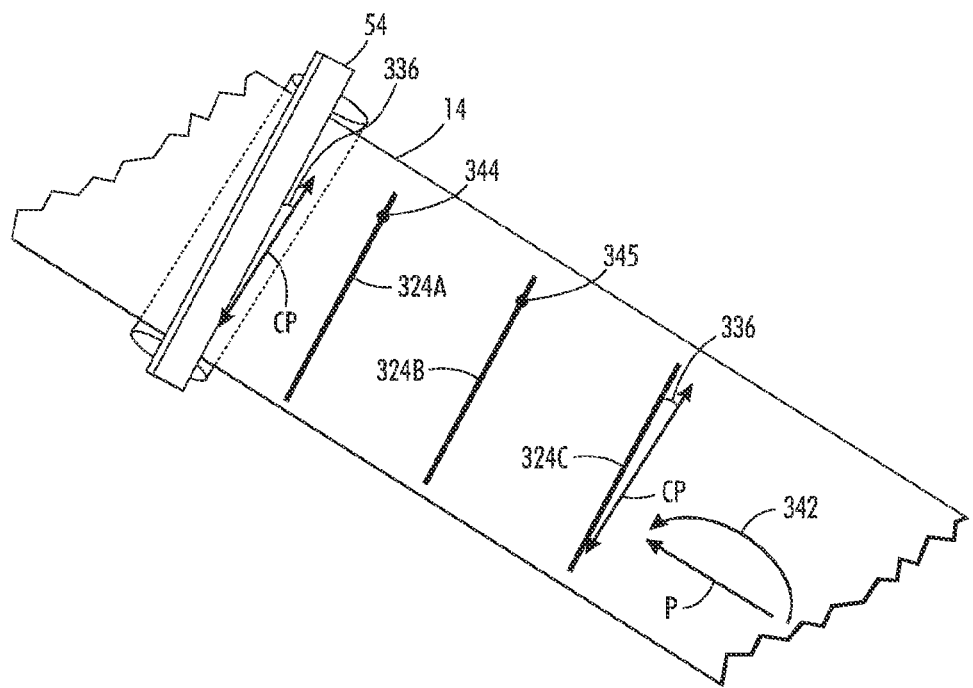
FIG. 3 is a perspective view of a media web in a continuous web printer with a series of lines printed on a first side of the media web.
Figure 4:
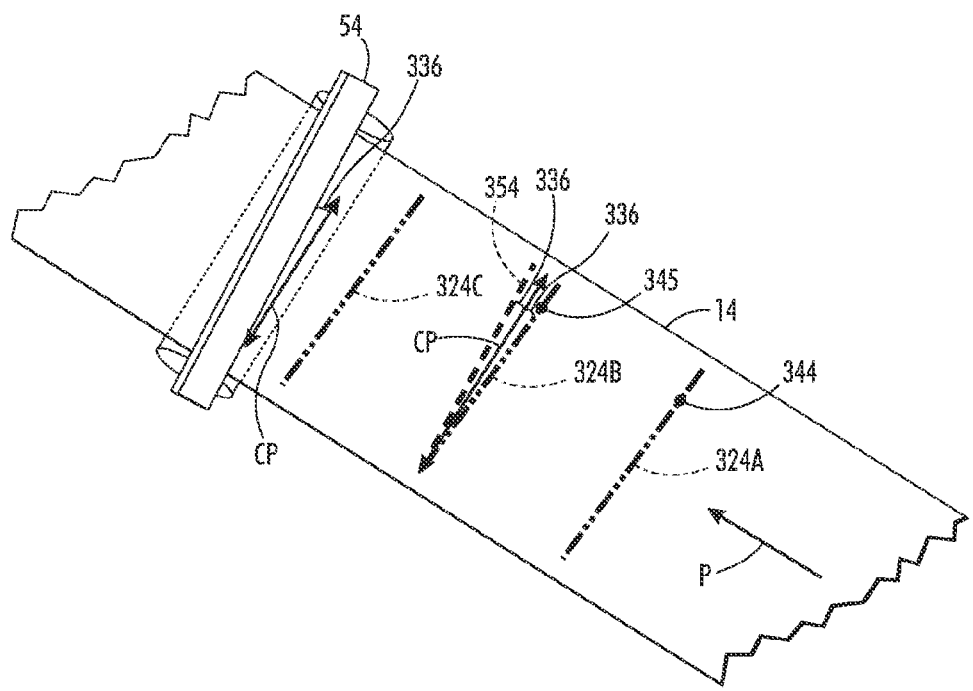
FIG. 4 is a perspective view of the media web in the continuous web printer after being inverted with a second side of the print medium passing an optical sensor.

During process 100, the media web 14 is inverted in a manner that preserves the relative location of ink drops formed by each inkjet in the print zone in the cross-process direction. One method of preserving the relative location of the ink drops while inverting the media through the print zone is to take up the media web 14 in a roll on the rewind unit 90 by coming over the top of the roll, and then moving the roll from the rewind unit 90 to the unwinder 8 without rotating the roll. The media web 14 is then fed from the roll with the media coming from the bottom of the unwinder 8. FIG. 3 and FIG. 4 depict the first side and second side passage, respectively, of the media web 14 as the media web 14 passes the optical sensor 54 in the process direction P. The media web 14 is inverted as indicated by arrow 342 in FIG. 3, so that the cross-process position of individual ink drops or marks on the lines 324A-324C remain substantially the same during both the first and second passes through the printer 5. For example, the mark 344 in printed line 324A in FIG. 3 remains in the same cross-process direction location in FIG. 4. The process direction order and orientation of the printed lines 324A-324C, however, is reversed during the second pass as depicted in FIG. 4. For example, in FIG. 3 the drop 344 is printed earlier than the drop 345, but when the media is inverted, the drop 344 passes a fixed line perpendicular to the process direction later than drop 345.

Process 100 continues as the optical sensor 54 generates additional image data of the printed lines through the thickness of the media web 14 (block 116). As depicted in FIG. 4, the second side of the media web 14 passes the optical sensor 54 for detection of the lines 324A-324C that were previously printed on the first side of the media web 14. As described above, the printed lines are formed with sufficient visibility for the optical sensor 54 to generate image data with the lines being detectable through the thickness of the media web 14. Additionally, the lines 324A-324C pass the optical sensor 54 in reverse order in the process direction during the second-side imaging. The lines 324A-324C also pass the optical sensor 54 reflected about the cross-process direction axis, which runs perpendicular to the process direction. The reflection causes any printed marks that are downstream of other printed marks along the line in the process direction to be upstream of the other printed marks in the process direction when the media web 14 is inverted and moved past the optical sensor 54 for the second time.

Process 100 continues by converting the image data generated when the optical sensor 54 generates image data of the printed lines on the first side of the media web 14 after the media web 14 is inverted and passed through the media path a second time where the second side of the media web faces the optical sensor 54 (block 120). The image data are referred to as a "show-through image" because the process 900 is identifying image data corresponding to the printed lines that show-through the thickness of the media web 14. For example, the lines 228A-228C in FIG. 2B are show-through image data generated when the optical sensor 54 generates image data of the lines 228A-228C after the media web 14 is inverted and passed through the media path in the printer 5 for a second time.

The captured show-through image data are converted to an amplitude map, which includes scanlines of pixels that extend in the cross-process direction and pixel columns of image data that extend in the process direction. In one embodiment, a parameter $n_G$ is defined, where $n_G$ is a number of squares selected from the image data for identification of the amplitude as a repeating pattern. For example, if the width of each square is 8 pixels and $n_G=4$, then the resolution in the cross process direction is approximately 32 pixels. For each scanline i and for each group of pixel columns in the range between index j and index $j+n_G$, the amplitude of the signal of period p is calculated. The parameter $n_G$ is selected to provide a spatial resolution in the show-through image data that is sufficient to resolve the fine structure of the signature in the process direction for the optical sensor 54, yet large enough to minimize the noise in the measurement.

Figure 7:
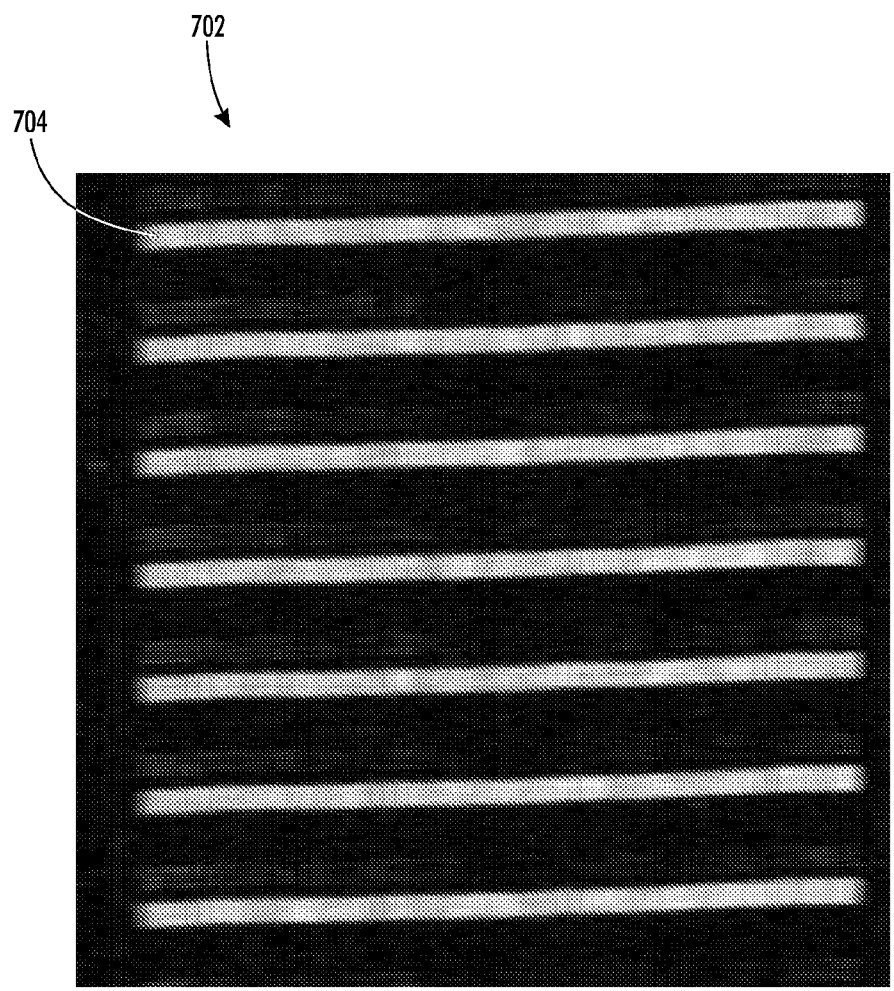
FIG. 7 is a plot depicting an amplitude map generated from image data corresponding to a plurality of printed lines formed on a print medium.

FIG. 7 depicts the amplitude map 702 of the show-through image data that correspond to a set of 400 scanlines. The aspect ratio of the amplitude map 702 is not 1 to 1, but corresponds to a capture that is approximately 1 inch in the process direction and approximately 22 inches in the cross process direction. In FIG. 7, the black regions correspond to a low amplitude, such as blank paper in the media web 14, and the white regions correspond to a high amplitude, such as the printed lines on the first side of the media web 14. FIG. 7 depicts sloped white lines, such as line 704, which correspond to the printed lines on the second side of the media web 14. The slope of each line indicates a skew in the optical sensor 54 that is not apparent when the lines pass the optical sensor during the first-side printing process.

Process 100 continues as the controller 50 generates a profile for each of the pixel columns extending through the amplitude plot in the process direction (block 124). The transition from a low amplitude signal over a blank area of the media web 14 to a high amplitude signal over a section of the ladder chart is detected at different points in the cross process direction. The controller 50 identifies an average of the lead edges of the printed lines for each position in the process direction. The process direction profile shows the relative process direction position of the printed lines in the frame of reference of the optical sensor 54 with improved precision.

Process 100 continues as the controller 50 identifies a signature for the optical sensor 54 with reference to the process direction profile generated from the amplitude map of the show-through image data from the printed lines (block 128). The controller 50 converts the units of the process direction profile from scanlines of image data to microns or another appropriate unit of distance using the predetermined resolution of the individual detectors in the optical sensor 54. The result is divided by a factor of two because the signature was introduced during the formation of the printed lines on the first side of the media web 14, and then introduced again when the media web 14 is inverted and passed through the media path a second time to form the show-through sheet image data of the printed lines. The profile is then interpolated from the measured points and extrapolated past the imaged regions to generate data in the process direction for each of the detectors in the optical sensor 54.

For example, in the printer 5 the optical scanner 54 includes detectors that generate 13,392 pixel columns, and the controller 50 identifies a signature for each of the detectors from the process direction profile data, which indicates an offset in the process direction from perfect alignment of the optical sensor 54 in the cross-process direction. A signature of zero, for example, indicates that an optical detector in the optical sensor is aligned with the expected location of the optical detector in the process direction. In one embodiment, a positive signature value indicates that the optical detector has an error in the upstream process direction, and a negative signature value indicates that the optical detector has an error in the downstream process direction. During operation of the printer, the controller 50 uses the identified signatures to adjust the image data generated by the optical sensor 54 to cancel registration errors that are generated due to skew, bow, and lenslet errors in the optical sensor 54.

Process 100 continues as the controller 50 identifies errors in the alignment of the optical sensor 54 with reference to the process direction profiles that are identified for the individual detectors in the optical sensor 54 (block 132). In the absence of defects in the optical sensor 54, such as skew, bow, or lenslet errors, the second side line runs in the cross-process direction for an aligned image. Any deviation from a horizontal line is, therefore, due to defects in the alignment of the optical sensor 54. The controller 50 identifies the deviation of the captured image of the ladder charts from a fixed scanline at each position in the cross process direction using the identified signatures for the detectors in the optical sensor 54. The magnitude of the deviation typically varies for different pixel columns in the image data, and the corresponding optical detectors in the optical sensor 54 that generate each pixel of image data. The controller 50 stores the identified errors in the memory 52 to compensate for the errors in the optical sensor during a subsequent registration operation for the inkjets in the marking units 21A-21D. FIG. 2A, FIG. 2B, and FIG. 5-FIG. 6 depict examples of first and second side image data corresponding to skew, bow, and lenslet errors, respectively, in the optical sensor 54.

Figure 2A:
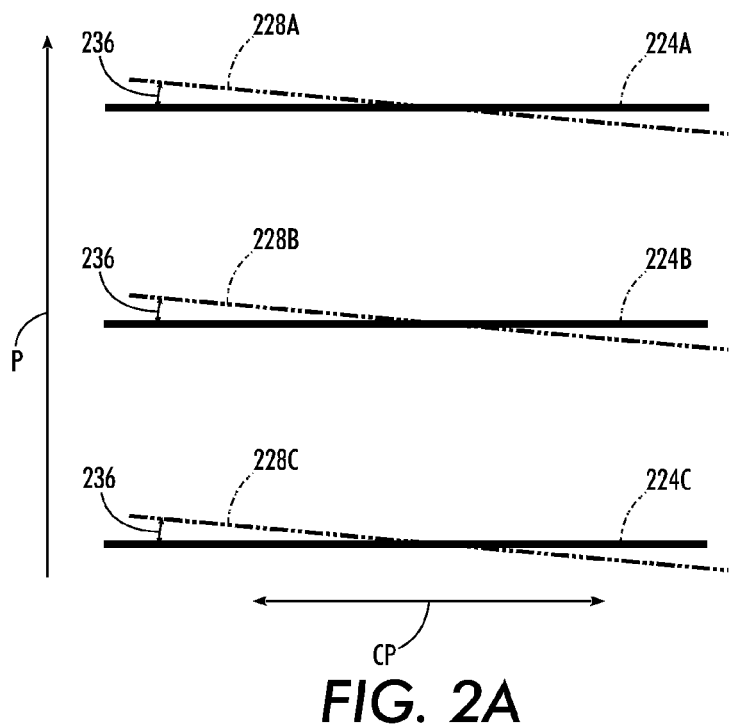
FIG. 2A is a composite view of image data corresponding to an optical sensor with a skew error.
Figure 2B:
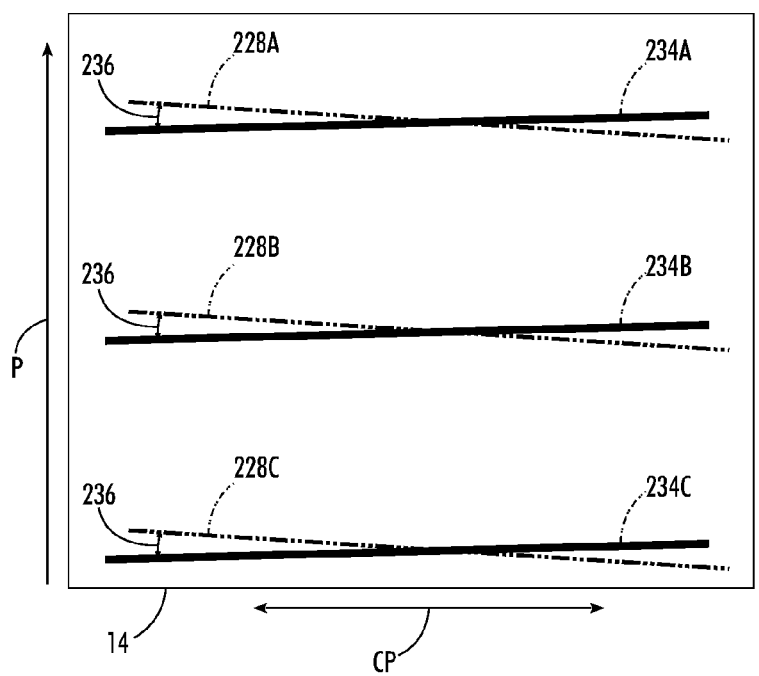
FIG. 2B is a composite view of printed lines on the first side of the print medium and of the printed lines through the print medium as the print medium passes through a media path in a duplex printer.

FIG. 2A depicts image data of the ladder test pattern including lines 228A, 228B, and 228C that the printer 5 generates after the media web 14 is inverted and the optical sensor 54 generates show-through image data of the printed lines while facing the second side of the media web 14. In FIG. 2A, the lines 224A-224C are imaginary reference lines that are parallel to the cross-process direction CP. Each of the reference lines 224A-224C is tangent to the corresponding show-through image data line 228A-228C, respectively. Each reference line contacts the corresponding show-through image data line at the center of the image data line in the cross-process direction. If the optical sensor 54 is correctly aligned with the cross-process direction CP, then the reference lines 224A-224A are substantially co-linear with the corresponding show-through image data lines 228A-228C. As depicted in FIG. 2A, however, the misalignment of the optical sensor 54 produces a skew in the show-through image data for the lines 228A-228C.

As depicted in FIG. 2B, the magnitude of error for the optical sensor 54 corresponds to the slope of the lines 228A-228C. The slope of the lines 228A-228C as generated in the image data from the optical sensor 54, however, exaggerates the magnitude of the error by a factor of two, since the inversion process combined with the existing alignment error in the optical sensor 54 effectively doubles the perceived error in the show-through image data. Since the optical sensor 54 includes a linear array of optical detectors that are arranged in the cross-process direction, the individual process direction error for each optical detector is one-half of the distance between a location of a the ink drop in the show-through image data generated by the optical detector and the process direction location of the corresponding reference line 234A-234C. For example, in FIG. 2A the line 232 represents a pixel column corresponding to one detector in the optical sensor 54. The process direction error for the optical detector corresponds to one half of the distance between the reference lines 224A-224C and the corresponding show-through image data lines 228A-228C taken along line 232.

FIG. 2B depicts the second-side image data lines 228A-228C superimposed on the printed first-side lines 234A-234C, respectively, as the lines appear printed on the media web 14 to the optical sensor 54. The inversion of the media web 14 and generation of second-side image data exposes the alignment error in the optical sensor 54 even though the optical sensor 54 is misaligned during both first and second side imaging. In FIG. 2B, the skew error in the optical sensor 54 is depicted by the angle 236 between, for example, the first-side line 234A and second-side image data line 228A. The angle 236 is the same for the lines printed on paper and for the lines captured with the sensor. If the printheads are aligned, then the image on the top of the media need not be printed or captured when the media is passed through the printer a second time because the printed lines on the side of the print medium that faces the optical sensor 54 appear to be aligned with the cross-process direction in the frame of reference of the optical sensor 54.

In FIG. 2B, the angle 236 has a magnitude that is twice the magnitude of the actual skew error of the optical sensor 54. As depicted in FIG. 3 and FIG. 4, each of the lines 324A-324C is skewed by the first angle 336 that corresponds to the angle of skew of the optical sensor 54 during the first-side printing operation that forms the lines 324A-324C. After inverting the media web 14, the magnitude of the angular skew of the lines 324A-324B remains the same, although the direction of the skew is reversed. The skew of the optical sensor 54, however, remains unchanged so the second side image data are generated with an apparent skew that is twice the magnitude of the actual skew. For example, in FIG. 4, the dashed line 354 is parallel to the skewed optical sensor 54 and the angle between the dashed line 354 and printed line 324B during the second-side pass is twice the skew angle 336.

Comparatively small defects in the optical sensor 54 may lead to objectionable image quality defects in printed images. Therefore, the controller 50 identifies the deviation of the second side lines from a perfect horizontal line extending in the cross-process direction with high precision. The image data generated through the thickness of the print medium, however, often has a low signal to noise ratio, and a simple edge detection algorithm is not sufficient to identify the process direction deviation of the second side image data as a function of position in the cross process direction.

While FIG. 2A, FIG. 2B, and FIG. 3 depict a skew error in the optical sensor 54, process 100 can similarly detect bow error and single detector lenslet errors in a similar manner. As with the skew error, the magnitude of the actual error in the optical sensor 54 is one-half of the difference between the relative process-direction locations of the inferred first-side image data, which will be at a fixed scanline for an aligned print and the corresponding second-side image data.

Figure 5:
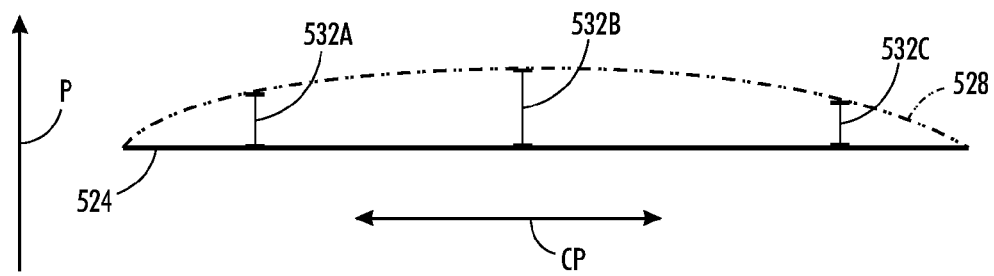
FIG. 5 is composite view of image data generated by an optical sensor with a bow error.

FIG. 5 depicts a sample of image data from a first side line 524 and a bowed second-side line 528. In FIG. 5, the process direction error for each pixel is one-half of the distance between corresponding pixels in the lines 524 and 528. For example, the process direction errors in locations 532A, 532B, and 532C have a magnitude that is one-half of the distance between the lines 524 and 528 at each of the locations 532A-532C.

Figure 6:
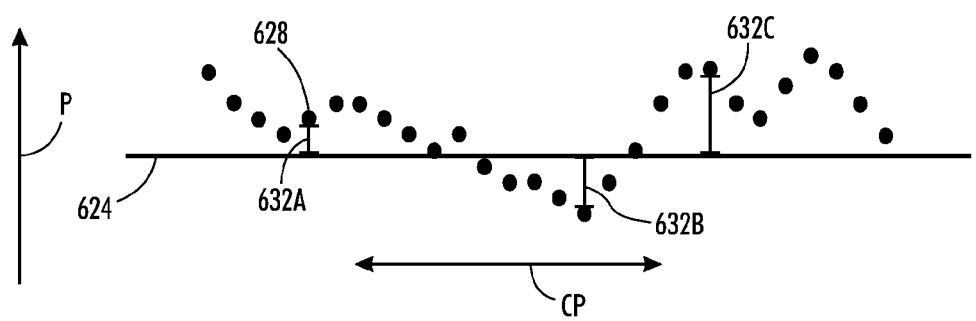
FIG. 6 is a composite view of image data generated by an optical sensor with lenslet errors.

FIG. 6 depicts a line of first side image data 624 with lenslet errors for individual optical detectors in the optical sensor 54. In FIG. 6, the individual detector errors are depicted as pixels 628 that are offset from the line 624 in the process direction for individual optical detectors and corresponding pixels in the image data. For example, the distances 632A, 632B, and 632C between three different pixels and the line 624 are each twice as long as the process direction error for the individual optical detectors that are associated with the corresponding pixels in the image data.

Referring again to FIG. 1, after identifying errors in the alignment of the optical sensor 54, process 100 performs a second registration operation for the inkjets in the marking units 21A-21D while compensating for the identified errors in the optical sensor (block 136). The second registration operation is similar to the registration operation described above with reference to block 104, but the registration process compensates for the process direction location of the image data generated by each of the optical detectors in the optical sensor 54. For example, the memory 52 stores an identified offset value of ten pixels in the process direction P for one of the optical detectors in the optical sensor 54. During the second registration process, the controller 50 shifts the image data from the optical detector by ten pixels in the process direction opposite to the identified offset to compensate for the identified error. If the measured error is not an integer number of pixels, the controller 50 performs a linear interpolation operation between adjacent pixels to represent the fractional offset and to compensate for the identified error. The timing adjustments applied to the inkjets in the print zone 20 with the compensation for the errors in the optical sensor 54 enable the printer 5 to produce printed images with correctly registered inkjets even if the optical sensor 54 is misaligned.

In an alternative embodiment, the captured image is analyzed without compensating for the errors introduced by the optical sensor 54 to provide process direction positions of the individual inkjets and a position of a print head represented by the average over the individual inkjets in the printhead. The controller 50 corrects the process direction positions by subtracting the signature signal calculated from the show-through image data corresponding to the cross process positions for each particular inkjet.

During operation of the printer 5, process 100 can be performed after the optical sensor 54 is cleaned or otherwise adjusted during a maintenance operation that may affect the alignment of the optical sensor 54. Additionally, process 100 can be performed periodically during extended operation of the printer 5 to compensate for variations in the alignment of the optical sensor that may occur due to environmental conditions such as changes in temperature or due to vibrations in and around the printer 5 that can affect the alignment of the optical sensor 54.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method of operating a printer comprising:
   moving a print medium through a printer a first time in a process direction;
   ejecting ink drops from a plurality of inkjets in the printer to form a line extending in a cross-process direction on a first side of the print medium;
   moving the print medium through the printer a second time with a second side of the print medium facing an optical sensor;
   generating image data corresponding to the line on the first side of the print medium with the optical sensor facing the second side of the print medium; and
   identifying a difference in a process direction between the line in the image data and another line extending in the cross-process direction to enable a controller to compensate for the difference during processing of image data generated by the optical sensor.

2. The method of claim 1, the optical sensor generating the image data with a plurality of optical detectors arranged in the cross-process direction.

3. The method of claim 2, the difference identification further comprising:
   identifying a difference in the process direction between a location of an ink drop in the image data of the line and the other line arranged in the cross-process direction.

4. The method of claim 3 further comprising:
   storing a compensation value in a memory corresponding to the identified difference for the one optical detector; and
   adjusting image data generated by the one optical detector with reference to the compensation value for the one optical detector.

5. The method of claim 4 further comprising:
identifying the compensation value as being one-half of the difference in the process direction between the location of the ink drop and a direction location of the other line extending in the cross-process direction.

6. The method of claim 5, wherein the other line extends through a center of the first line in the cross-process direction.

7. The method of claim 1, the identification of the difference in the process direction further comprising:
identifying a slope of the line in the image data with reference to the cross-process direction.

8. The method of claim 7 further comprising:
storing in a memory a value corresponding to the identified slope difference; and
adjusting image data generated by the optical sensor with reference to the value stored in the memory.

9. The method of claim 1 further comprising:
ejecting ink drops from a plurality of inkjets in the printer to form a plurality of lines on the first side of the print medium, each line in the plurality of lines extending in the cross-process direction;
generating the image data corresponding to the plurality of lines on the first side of the print medium with the optical sensor facing the second side of the print medium; and
identifying the difference in the process direction with reference to an average difference between the plurality of lines in the image data and another plurality of lines extending in the cross-process direction.

10. A printer comprising:
a media transport configured to move a print medium in a process direction;
a plurality of inkjets configured to form a printed image on the print medium;
an optical sensor configured to generate image data corresponding to the print medium and a feature in each page of the print medium; and
a controller operatively connected to the media transport, a marking unit, and optical sensor, the controller being configured to:
operate the media transport to move a print medium through the printer a first time in a process direction;
generate firing signals for the plurality of inkjets to eject ink drops to form a line extending in a cross-process direction on a first side of the print medium;
operate the media transport to move the print medium through the printer a second time with a second side of the print medium facing the optical sensor;
generate image data corresponding to the line with the optical sensor facing the second side of the print medium; and
identify a defect in the optical sensor with reference to a difference in the process direction between the line in the image data and another line extending in the cross-process direction.

11. The printer of claim 10 wherein the optical sensor includes a plurality of optical detectors arranged in a cross-process direction across the print medium.

12. The printer of claim 11, the controller being further configured to:
identify the difference in the process direction as a difference between a location of an ink drop in the image data generated with one of the plurality of optical detectors in the optical sensor and the other line extending the cross-process direction; and
identify a defect in the one optical detector with reference to the difference between the location of the ink drop in the image data and the other line extending in the cross-process direction.

13. The printer of claim 12, the controller being further configured to:
store a compensation value in a memory corresponding to the identified defect of the one optical detector; and
adjust image data generated by the one optical detector with reference to the compensation value to compensate for the identified defect.

14. The printer of claim 13, the controller being further configured to:
identify a magnitude of the defect in the one optical detector as being one-half of the difference in the process direction between the location of the ink drop and the other line extending in the cross-process direction.

15. The printer of claim 13, the controller being further configured to:
generate the other line at a location that enables the other line to extend through a center of the line extending in the cross-process direction on the first side of the print medium.

16. The printer of claim 10, the controller being further configured to:
identify a slope of the line on the first side of the print medium with reference to the image data; and
identify a skew defect of the optical sensor with reference to a difference between the identified slope and the cross-process direction.

17. The printer of claim 16, the controller being further configured to:
store a value corresponding to the identified skew in a memory; and
adjust image data generated by the optical sensor with reference to the value corresponding to the identified skew to compensate for the identified skew.

18. The printer of claim 11, the controller being further configured to:
generate firing signals for the plurality of inkjets to form a plurality of lines on the first side of the print medium, each line in the plurality of lines extending in the cross-process direction;
generate image data corresponding to the plurality of lines with the optical sensor facing the second side of the print medium; and
identify a defect in the optical sensor with reference to an average difference in the process direction between the plurality of lines in the image data and another plurality of lines arranged in the cross-process direction.

* * * * *